Aug. 19, 1958

M. J. ENELL 2,847,851

PRESSURE TESTING DEVICES

Filed Jan. 14, 1955

INVENTOR.
Milton J. Enell,
BY
Gehr & Bronard,
his ATTORNEYS.

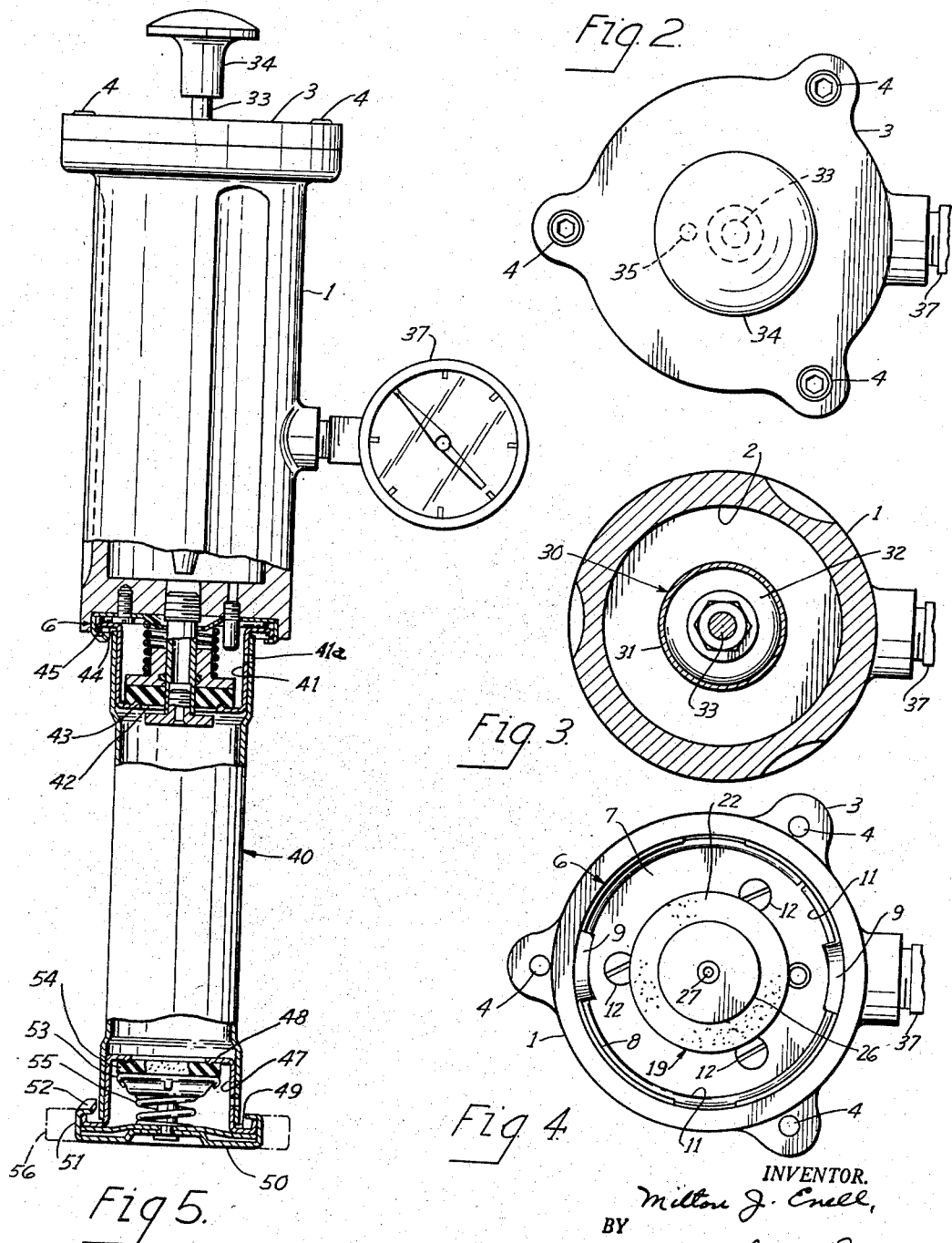

Aug. 19, 1958 — M. J. ENELL — 2,847,851
PRESSURE TESTING DEVICES
Filed Jan. 14, 1955 — 3 Sheets-Sheet 3

INVENTOR.
Milton J. Enell,
BY
Gehr & Leonard,
his ATTORNEYS.

United States Patent Office 2,847,851
Patented Aug. 19, 1958

2,847,851

PRESSURE TESTING DEVICES

Milton J. Enell, Lakewood, Ohio

Application January 14, 1955, Serial No. 481,803

5 Claims. (Cl. 73—40)

This invention relates to testing devices and particularly to a fluid pressure testing device for testing for leaks in sealed cooling systems of automobile engines and in automobile engine radiators and radiator caps.

In present day passenger automobiles and trucks, sealed liquid cooling systems are used for cooling the engines. In such a system the filling spout of the radiator is sealed during normal operation of the engine by a readily detachable cap having a sealing disc or plug which is spring pressed against an internal annular seat in the spout.

Pressure is developed in such cooling systems during engine operation, the amount depending to a large extent upon the engine design and speed and upon the temperature of the coolant. Minute fissures and preforations which in an unsealed cooling system would cause so little loss of coolant liquid as to be of no consequence cause a large loss of coolant liquid when in a sealed system in which the liquid coolant is under pressure. Again, anti-freeze solutions now used tend to leak through joints, small perforations, and fissures much more easily than water.

Therefore, it has become increasingly necessary since sealed systems have come into use and the pressure therein has been increased, that the cooling system be free from any leaks due to faulty connections between the various parts or perforations, fissures, or cracks in the radiator, engine block, or various fittings and connecting parts.

One of the principal objects of the present invention is to provide a small, simple, and compact device which is particulary adapted for testing automobile engine cooling systems, radiators, and radiator caps.

The present device comprises essentially a body which may be in the form of an accumulating tank into which air under pressure may be supplied, a fitting on the body by which a tank or source of air under pressure can readily be connected to, or disconnected from, a conventional radiator spout of an automobile radiator, a valve or sealing mechanism adapted for cooperation with the conventional radiator spout in a manner to connect the fitting and radiator so that the interior of the cooling system is in communication with the interior of the tank or source of air and both of the latter can be placed under the same pneumatic pressure concurrently, a fluid pressure operated gauge connected with the device so as to indicate the pressure in the cooling system to which the radiator is connected, and an air pump, which may be a permanent part of the device, by which air under pressure can be supplied into the tank and therethrough into the cooling system for placing both the interior of the cooling system and the tank under pneumatic pressure.

The invention also includes an adaptor which can be connected onto the fitting and onto the filling spout of a truck radiator so that the testing device may be connected to the truck radiator filling spout as readily as to the filling spout of a passenger automobile, and vice versa.

Further, the invention contemplates an adapter which can be connected to the device in the same manner as the filling spout of the radiator and, in turn, can receive a radiator cap in a manner such that the cap can be tested to determine whether it can effectively seal the radiator inlet spout at the normal operating pressures of the associated cooling system.

Another feature of the invention is to provide means for effecting sealing engagement between the fitting and radiator spout, which means automatically releases and relieves the pressure developed in the cooling system if the cooling system pressure exceeds a predetermined maximum.

Other objects and advantages will become apparent from the following description in which reference is made to the drawings, in which:

Figure 2 is a fragmentary top plan view of the pressure testing device illustrated in Figure 1;

Figure 3 is a cross sectional view of the device taken on the plane indicated by the line 3—3 of Figure 1;

Figure 4 is a bottom plan of the device illustrated in Figure 1 when detached from the radiator spout.

Figure 5 is a reduced front elevation, partly in section, of the testing device illustrated in Figure 1 with the cap-testing interponent and a cap being tested connected thereto in operating relation;

Figure 1:
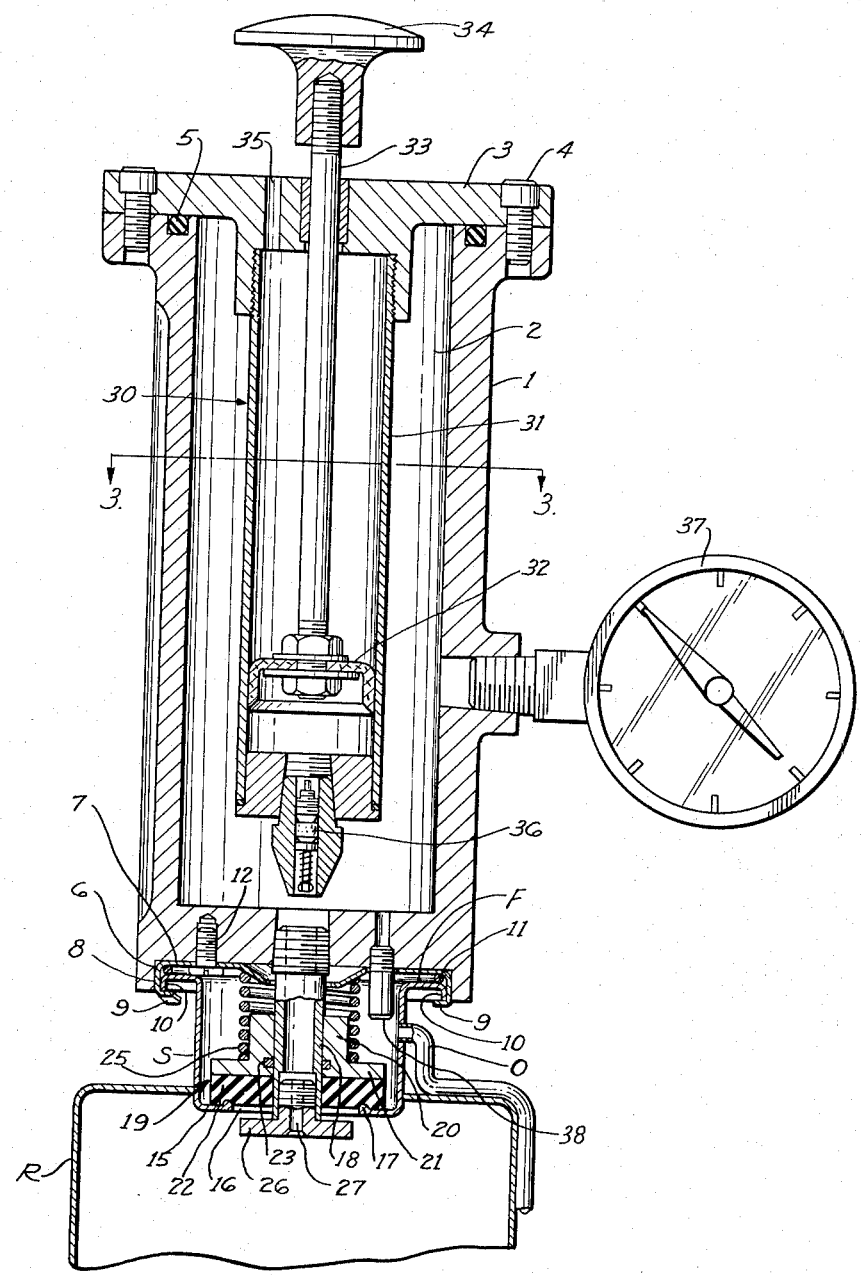
Figure 1 is a longitudinal sectional view through the axis of a prefered form of testing device embodying the principles of the present invention, and through the filling spout and a portion of an automobile radiator to which the device is connected, parts thereof being shown in elevation for clearness in illustration.
Figure 6:
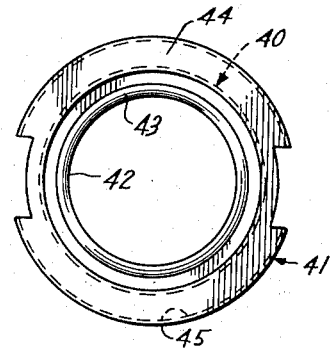
Figure 6 is a top plan view of the interponent.

Referring to Figures 1 through 3, the testing device comprises principally a rigid body or tank 1 having therein a cavity 2 which forms a storage reservoir for a fluid testing medium, such as compresesd air. The tank 1 is closed at one end by a suitable cap 3 which is secured to the tank by means of bolts 4. A sealing washer 5 is interposed between the end wall of the tank 1 and the cap 3. The lower end of the tank comprises, in effect, a fitting for connection to a radiator spout for admitting air into the spout from an outside source.

Mounted on the lower end of the tank 1 so as to form part of the fitting is a connector 6 which is adapted to be connected to the upper end of the filling spout S of an automobile radiator R in the same manner as the conventional filling spout cap.

The connector 6 has a top wall 7 and a peripheral flange 8 surrounding the top wall. On the free edge of the flange 8 are inturned connecting lugs 9 which slope circumferentially of the connector so as to act as cam surfaces. The spout S has a top flange F and depending peripheral flange 10, the lower edge of which slopes circumferentially of the spout and provides cam surfaces complementary to the lugs 9. The lugs 9 are arranged to pass through the conventional circumferentially extending, radially open, slots of the top flange F of the radiator spout and upon turning of the connector a quarter turn about its axis when the lugs 9 are below the level of the flange 10, to engage beneath the cam surfaces of the flange 10 and draw the connector 6 axially toward the upper end of the spout.

A suitable O-ring 11 may be provided in the connector 6 so that when the connector is drawn onto the spout by the cam surfaces the upwardly exposed face of the flange F of the filling spout will engage the C-ring 11 and seat firmly thereagainst and prevent any appreciable relative rocking of the tank 1 and spout S transversely of their common axis.

In the form illustrated, the connector 6 is shown as a sheet metal stamping identical with the body or shell of the conventional radiator cap and having its end wall 7 secured in fixed relation against the end of the tank 1 by means of suitable bolts 12.

Figure 7:
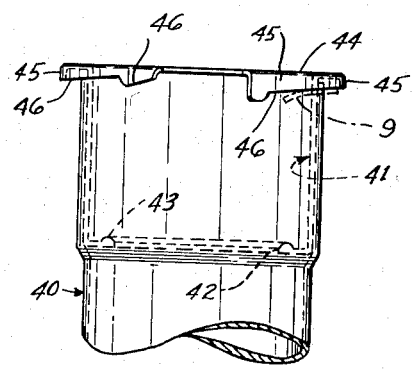
Figure 7 is a fragmentary front elevation of the interponent.

As illustrated in Figure 1, the conventional spout S of the radiator R is provided at its lower end with an inturned annular flange or bottom wall 15 having a radiator filling orifice 16 through which the spout S communicates with the interior of the radiator R. The flange or wall 15 is provided with a raised seat or bead 17 in surrounding relation to the orifice 16. Between its opposite ends the spout S is provided with overflow pipe O. The connecting or upper end of the spout S is the same as the end of the adaptor, illustrated in Figures 7 and 8, and later to be described in detail.

In order to connect the tank 1 for communication with the interior of the radiator R and thereby with the engine cooling system, the tank 1 is provided with a rigid coaxial tube 18 which is in communication with the interior of the tank 1. Mounted on the fitting for movement relative thereto endwise of the connected spout S is a valve plug 19. In the form illustrated the plug 19 is slidably mounted on the tube 18. The plug may comprise a metal piston 20 which has an enlarged head portion 21 of greater diameter than the seat 17, and a gasket or sealing portion 22 coaxial with the head portion 21. The sealing portion or sealing portion 22 is preferably of a rubber or synthetic composition which is not adversely affected by conventional anti-freeze mixtures and preferably is sufficiently resilient so that when pressed against the seat 17 of the spout S, it can form an effective seal therewith. The gasket portion 22 is unconfined radially so that it can yield without wrinkling and thus present a smooth seating face to the seat 17. The gasket portion 22 may fit the tube closely so as to provide partial seal therebetween. However, the piston 20 is provided with an internal groove in which is seated a resilient sealing washer 23, thus providing an effective seal to prevent the passage of air or pressure fluid between the tube 18 and the valve plug 19.

The valve plug 19 is urged endwise away from the tank 1 by means of springs 25. Preferably two springs are used and are oppositely spiralled or wound so that they do not tend to rotate the valve plug 19 as it is moved axially of the tube 18 toward and away from the tank 1.

Secured to the outer end of the tube 18 is a suitable stop cap 26 which limits the outward movement of the valve plug 19. The cap is preferably screw threaded into the tube 18 so that it can be readily detached for removal and changing of the gasket portion 22 of the plug. The cap 26 has an axial passage 27 therein communicating with the interior of the tube 18 and opening through the outer end of the cap. The tube 18 and cap 26 constitute not only a means for connecting the valve plug to the tank for movement relative to the tank but also a means for by-passing air from the tank around the valve plug.

Suitable means are provided for charging the tank with a supply of air under pressure. In the form illustrated this means comprises a pump 30 having a cylinder 31, piston 32 and an operating rod 33. The pump is disposed within the tank, the cylinder 31 being in threaded engagement with the cap 3 and the operating rod 33 extending through a suitable bore in the cap 3 to the exterior of the tank. The outer end of the rod is provided with the usual hand knob 34. The pump is provided with an air inlet 35 and at its outlet is provided with a check valve 36 which is arranged to permit air to escape from the pump cylinder 31 into the tank 1 and prevent return of such air into the cylinder 31. The valve used preferably is one of the conventional automobile tire valves.

A suitable pressure indicating gauge 37 is connected to the body 1 and is in communication with the tank 1 so as to indicate the pressure therein and therefore in the cooling system.

In using the device for checking an engine cooling system for leaks, the radiator cap is removed from the spout S and the device is disposed in coaxial relation to the spout and moved theretoward so that the valve plug 19 seats against the seat 17. Thereupon the device is pressed further in the direction toward the spout compressing the springs 25 so as to hold the valve firmly against the seat 17. During this installation the lugs 9 are passed through suitable circumferential slots in the flange F of the spout S, and then the device is rotated about its axis relative to the spout S so that the lugs 9 engage the camming surfaces on the peripheral flange 10 of the spout S, thus locking the device to the radiator spout S in the same manner that the conventional radiator cap is installed on the spout and locked thereto. Since the plug 19 can slide on the tube 18, the valve plug adjusts itself properly to the seat. Thereupon, the pump 30 is operated to build up a predetermined pressure in the tank 1 and this pressure is, of course, concurrently built up in the interior of the radiator and cooling system.

If any leaks are present any place in the cooling system including the radiator, fittings, engine block, pumps, and the like, the predetermined pressure in the tank 1 will drop gradually, depending upon the severity of the leak, and this loss of pressure is indicated by the gauge 37. Most leaks are quite obvious if any appreciable size and it is only the more minute leaks which are difficult to locate. The tank however, is sufficiently large so that, along with the space in the radiator between the level of the seat 17 and the normal level of the cooling liquid, a considerable escape of air or liquid from the cooling system can occur before the pressure in the tank 1 is depleted. Thus, the mechanic or operator can pump up the tank 1 and cooling system to the desired degree and for each charge of the tank, can have several minutes within which to search for leaks before the pressure in the tank is depleted.

Another distinct advantage of the arrangement described results from the spring seating of the plug 19. Quite frequently tests of radiators are made while the engine is running and not infrequently, due to defective gaskets, cracks in the block, and the like, there is a blow-by from the cylinders into the cooling system. Such blow-bys introduce gaseous media under high pressure into the cooling system and build up the pressure therein far above normal. The pressure developed in this manner may be sufficient to burst the radiator or possibly to damage the testing device. However, the springs 25 are so chosen that such pressure developed in the system by blow-by will unseat the plug 19 before becoming sufficiently great to damage the radiator, fittings, or device, thus providing an effective safety valve. For this purpose, the springs 25 preferably are near as may be constant strength springs—that is, springs in which the pressure exerted in a seating direction remain substantially constant for a number of positions of the plug 19 with the springs in correspondingly compressed condition. Generally the springs should release the plug 19 at pressure of from seventeen to twenty-two pounds per square inch in the cooling system. If constant strength springs are not used, then a suitable safety valve 38 may be provided and connected to the tank 1, the valve 38 being adapted to discharge into the atmosphere when the pressure in the tank 1 exceeds a predetermined maximum.

Referring next to the adapter which is used in connection with the device for testing radiator caps, a convenient form of the adapted is illustrated in Figure 5. In this connection, it is to be noted that there are at present two conventional lengths of radiator spouts for pleasure cars, the only difference being in the distance from the upper end or flange F of the spout S to the seat 17 for the sealing plug of the cap. Usually this difference is only ¼" and sufficient allowance is made in the movement of the plug 19 so that the plug can accommodate itself to either type of spout. Radiator caps, however, are not made to provide sufficient movement of their sealing plug for this accommodation while retaining only the required seating pressure between the conventional cap valve plug and spout seat. Accordingly, for testing caps, the interponent 40 is provided.

This adapter comprises a metal tube, one end of which is provided with a stamped metal cup 41 corresponding to the cup that forms the upper end of a conventional radiator spout. The cup has at its base an orifice 42 leading into the tube 40, a valve seat 43 (corresponding in function to the seat 17 heretofore described), and a peripheral flange 44 which carries about its periphery the depending flange 45 with cam surfaces 46 at the lower edge. The tube 40 and cup 41 are provided with registered openings forming an overflow or vent 41a.

At the opposite end of the tube 40 a cap 47 is provided, this cap being the same in all respects as the cap 41 except that the distance of the seat 48 of the cap 47 is a lesser distance from the peripheral flange 49 than the distance of the seat 43 from the flange 44.

As mentioned, either end of the tube 40 can be connected to the present device and accordingly, if any cap is to be tested, the end of the tube 40 which fits the particular cap is connected to the cap to be tested and the opposite end of the tube 40 is connected to the present device. Thereupon, pressure is built up in the tank 1 and interponent tube 40 sufficient to unseat the valve plug of the cap and cause it to leak and this pressure being allowed to decrease by leakage until the pressure ceases to decrease, as evidenced by the gauge 37.

As illustrated in Figure 5, a conventional cap, indicated at 50, has a peripheral flange 51 and cam engaging lugs 52 adapted to cooperate with the cam surfaces on a radiator cap or the receiving end of the adapter. The cap 50 is provided with a suitable plug 53 which carries the sealing gasket 54 engageable with the seat 48 or seat 43 of one end of the tube 40, or the seat 17 of the radiator spout. This valve plug 53 is seated by a suitable spring 55. Conventional radiator caps are provided with integral ears 56 which form a convenient finger grip for turning the caps.

Here it is to be noted that quite often the cam engaging lugs 9 of the present device become damaged so that they will not properly engage the cam surfaces of the flanges 10 of the spout or the cam surfaces 46 of the adapter. For this reason, it is preferred to make the element 6 of the device out of a conventional radiator cap as such is always readily available in an emergency at the garage or repair shop. The valve can be removed from the conventional cap and the remaining body shell tapped so as to permit passage of the tube 18 therethrough. The cap shell then can be seated into the end of the tank 1 and substituted for the original connector 6. In such cases, all that is necessary is to cut off the ears 56 of the cap, tap the center of the cap so that it readily accommodates the tube 18, and drill holes properly positioned for receiving the bolts 12.

Figure 8:
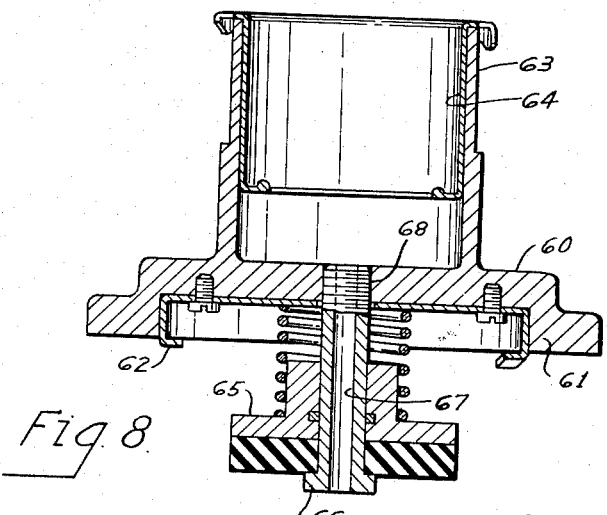
Figure 8 is a longitudinal sectional view of an adaptor used in connection with the testing device illustrated in Figure 1.

As mentioned, the radiator filling spouts of trucks are generally the same as pleasure cars except they are larger in diameter. In order to adapt the present device for use with a truck, the adaptor 60 illustrated in Figure 8 is provided. This adaptor has a large diameter bottom portion 61 in which is secured the outer shell 62 of a conventional truck cap, the shell being so arranged that it can be fastened to a filling spout of a truck radiator in the same manner as the conventional cap. The portion 61 of the adaptor is connected to a smaller portion 63, the upper end of which is provided with a cup 64 which may be identical with the cup 41 heretofore described so that the present tank 1 can be attached thereto. The member 60 is provided with a spring seated plug 65 which is the same as the plug provided in the conventional truck cap except that the central rod 66 is provided with an axial bore 67 which extends from one end thereof to the other end and which connects with a bore 68 in the adaptor 60. Thus, the large end of the adaptor 60 can be secured on the cup 64 of the adaptor and air from the tank 1 can then flow into the cap 64 through the bore 68 and duct 67 into the radiator of the truck.

If desired, of course, this adaptor may be reversed, the present tank being made primarily for trucks and of larger size and the adaptor arranged so that the larger end fits the tank 1 and the smaller end fits the conventional spout of a pleasure car, the smaller end, of course, being provided with the conventional sealing plug modified to permit passage of an axially therethrough as above described.

It is apparent from the foregoing description that the device can be as readily attached to the conventional filling spout in the same manner the conventional radiator cap and that when so connected it will be maintained in coaxial alignment therewith and can maintain the entire cooling system under sufficient internal pressure for a considerable period of time if the leaks are minute.

Having thus described my invention, I claim:

1. In a pressure testing device for an automobile radiator having a filling spout with a coaxial seat therein facing toward, and spaced from, the inlet end of the spout, with an overflow vent between the seat and inlet end, and with connecting means for connecting a detachable cap to the inlet end of the spout, a fitting including a tank and connecting means carried on one end of the tank and adapted for connecting the tank to the inlet end of said spout, pump means for charging the tank with a supply of air under pressure, check valve means interposed between the pump means and tank for preventing escape of air from the tank into the pump means, a tube connected at one of its ends to said end of the tank and in continuous communication with the interior of the tank at said one of its ends, and continuously open at its other end, and extending endwise outwardly from said end of the tank, a valve plug mounted on the tube, and a pressure gauge connected to the device so as to indicate the pressure of the air in the tube, the improvement wherein the valve plug is mounted on the tube for bodily movement axially endwise of the plug relatively toward and away from said end of the tank to different operating positions and having, on the end opposite from the tank and facing away from the tank, a seating area surrounding the tube, sealing means interposed between the plug and tube for preventing the passage of air between the plug and the tube, resilient means urging said plug endwise of the tube toward the opposite end of the tube, said plug being adapted to seat under pressure of the resilient means on said annular seat when the fitting is connected to the spout.

2. The structure according to claim 1 characterized in that said valve plug comprises a relatively rigid piston and is mounted on, and in coaxial relation with, the tube for sliding endwise on the tube, said resilient means is a compression spring and engages the piston and urges it away from the fitting, a slip seal is interposed between the outer periphery tube and the inner periphery of the piston and seals the space therebetween, and said plug includes, at the face opposite the fitting, a resilient sealing element adapted to cooperate with the seat of the spout.

3. The structure according to claim 1 characterized in that the resilient means are capable of delivering substantially constant restorative force throughout a plurality of operative positions of the plug endwise of the tube.

4. In a pressure testing device for an automobile radiator system including an automobile radiator inlet spout, a closure cap for the spout, connecting means on the inlet end of the spout, cooperable connecting means on the cap for detachably connecting the cap to the spout, an annular seat in the spout, facing toward the inlet end of the spout, the spout having an overflow vent between the seat and inlet end of the spout, and a plug on the cap seatable on the seat of the spout, said device comprising an accumulating tank, pump means for charging the tank with a supply of air under pressure, check valve means to prevent the escape of air under pressure from the tank back into the pump, a pressure gauge connected with the tank, a fitting on one end of the tank and having thereon cooperable connecting means adapted for connection with said connecting means of the spout for detachably connecting the tank to the spout, a tube extending endwise of the fitting, a valve plug mounted on the tube, said tube being continuously in communication at one end with the interior of the tank and having its other end continuously open at a location beyond the plug in a direction away from the tank for by-passing air from the tank around the plug, the improvement wherein the plug is mounted on the tube for sliding movement endwise of the tube to different operating positions wherein the plug can accommodate itself to, and seat on, the spout seat when the fitting is connected to the spout, sealing means interposed between the inner periphery of the plug and outer periphery of the tube, and spring means urging the plug away from said end of the tank.

5. In a pressure testing device for cooperation with a tubular member having a coaxial seat therein facing toward, and spaced from, one end of the member, and with connecting means for connecting a detachable cap to said end of the member, a fitting including a body having a cavity therein and connecting means carried on one end of the body and adapted for connecting the body to said end of said member, a pump connected to the body for supplying air under pressure into the cavity, a tube connected at one of its ends to, and in continuous communication with the cavity at, said end of the body, and continuously open at its other end, and extending endwise outwardly from said end of the body, a valve plug mounted on the tube, a pressure gauge connected to the body so as to indicate the pressure of the air in the tube, the improvement wherein the valve plug is mounted on the tube for bodily movement axially endwise of the plug relatively toward and away from said end of the member to different operating positions and having, on the end opposite from the body and facing away from the body, a seating area which surrounds the tube, sealing means are interposed between the plug and tube for preventing the passage of air between the plug and the tube, resilient means urge said plug endwise of the tube toward the opposite end of the tube, said plug being adapted to seat under pressure of the resilient means on said annular seat when the fitting is connected to said member, and a check valve is interposed between the pump and cavity for preventing escape of air from the cavity into the pump.

References Cited in the file of this patent

UNITED STATES PATENTS

| | | |
|---|---|---|
| D. 176,261 | Hughes | Dec. 6, 1955 |
| 1,335,073 | Osborn | Mar. 30, 1920 |
| 1,337,132 | Harpst | Apr. 13, 1920 |
| 1,764,616 | Fleming | June 17, 1930 |
| 1,848,198 | Reid | Mar. 8, 1932 |
| 2,007,100 | Varese | July 2, 1935 |
| 2,225,964 | Bailey | Dec. 24, 1940 |
| 2,446,219 | Eaton | Aug. 3, 1948 |
| 2,668,437 | Patch | Feb. 9, 1954 |
| 2,732,971 | Holmes et al. | Jan. 31, 1956 |
| 2,760,367 | Stromberg | Aug. 28, 1956 |

OTHER REFERENCES

Publication "Pres-sure-tite Tester" by Pres-Sure-Tite Products Inc., Detroit, Michigan, 2 pp. (1954).